Oct. 23, 1934.  W. L. THOMAS  1,978,287
VEHICLE LOADING MEANS FOR BOX CARS
Filed March 9, 1932  3 Sheets-Sheet 1
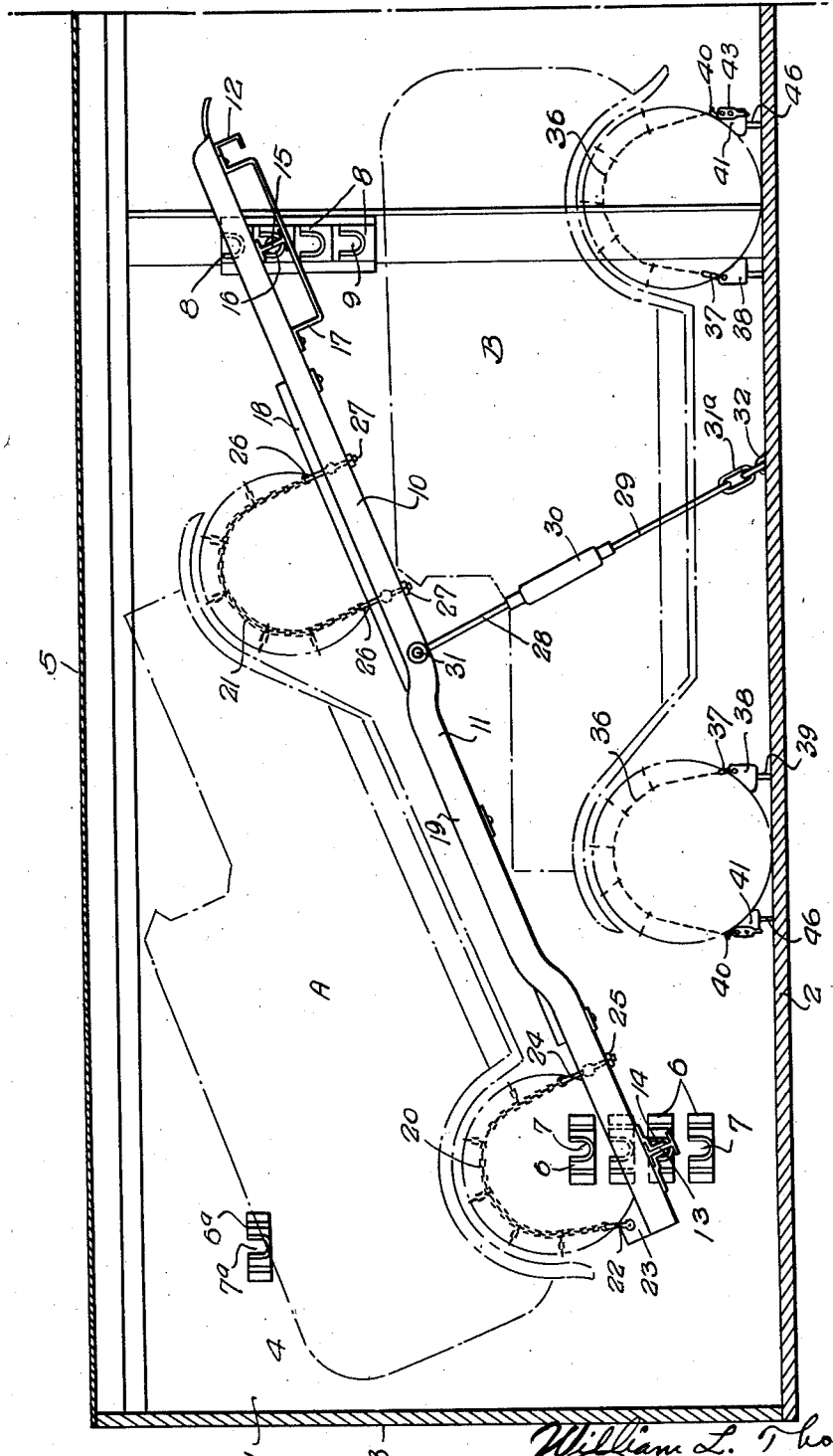

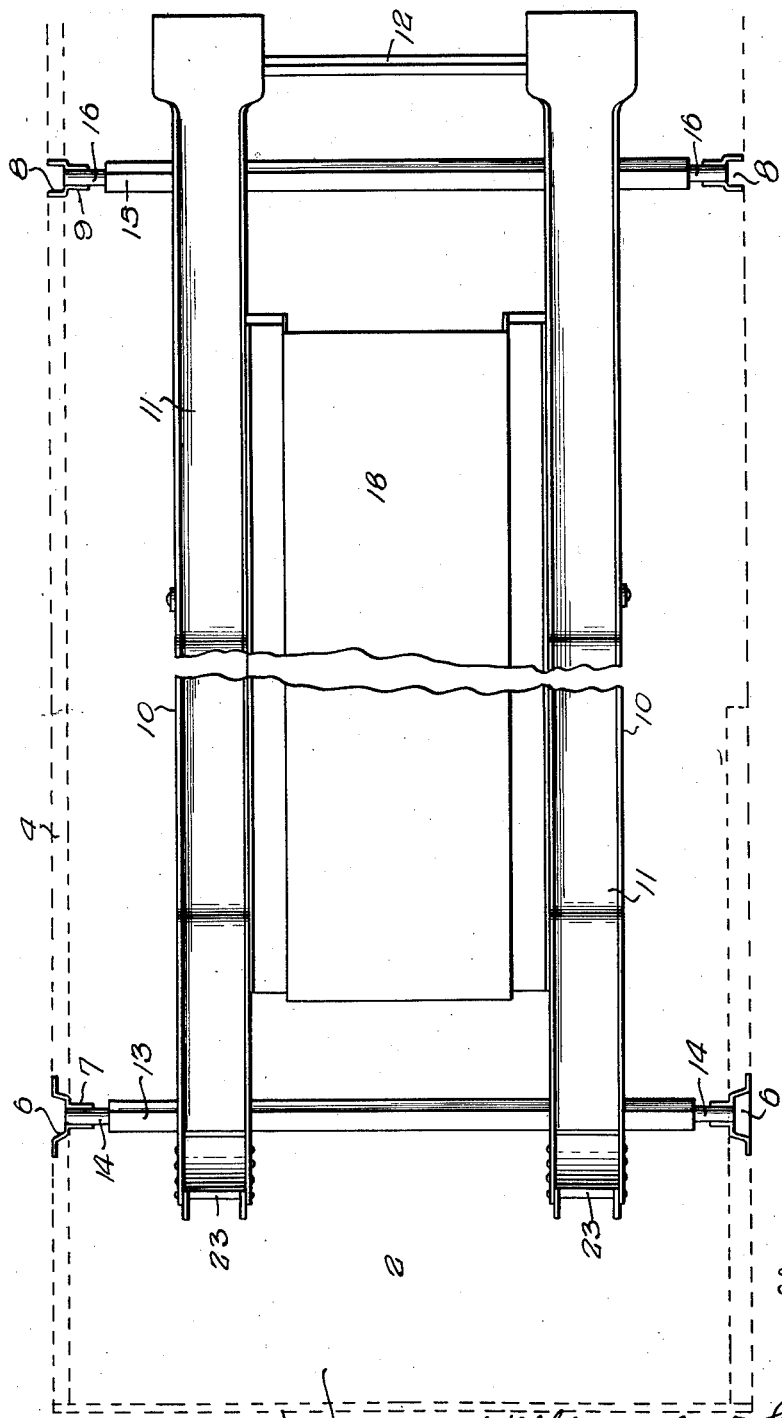

Oct. 23, 1934.　　　W. L. THOMAS　　　1,978,287
VEHICLE LOADING MEANS FOR BOX CARS
Filed March 9, 1932　　3 Sheets-Sheet 3
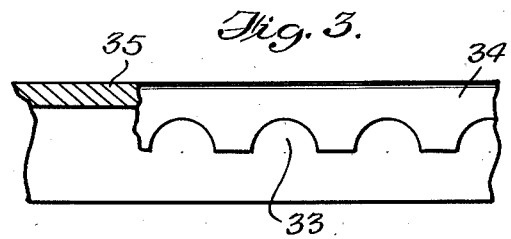
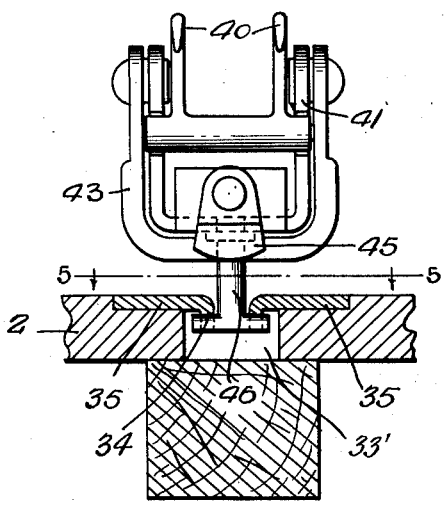
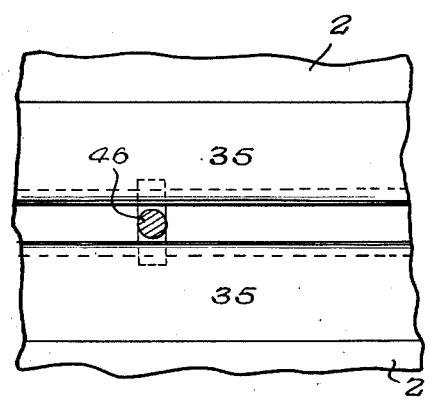
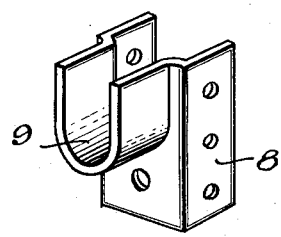
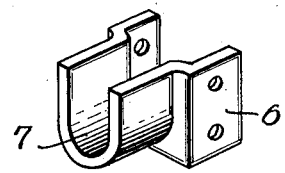
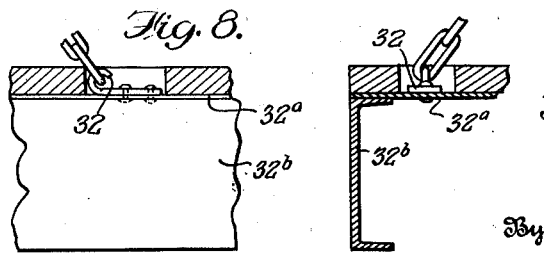

Patented Oct. 23, 1934

1,978,287

UNITED STATES PATENT OFFICE 1,978,287

VEHICLE LOADING MEANS FOR BOX CARS

William L. Thomas, Haverstraw, N. Y., assignor to The New York Central Railroad Company, a corporation of New York Application March 9, 1932, Serial No. 597,839

10 Claims. (Cl. 105—368)

This invention relates to vehicle loading means for box cars, and one object of the invention is to provide simple, reliable and efficient means for loading vehicles in box cars in such manner that a greater number of vehicles may be loaded in a car than has been possible by prior means used for the purpose.

Another object of the invention is to provide a loading frame, deck, or rack which may be adjustably supported in an inclined position relative to the car floor so as to support a vehicle in such inclined position, and so that another vehicle may be supported on the floor and nested in the space under the inclined vehicle.

Still another object of the invention is to provide novel and improved means for supporting the frame, rack or deck in any one of a number of inclined supporting positions and also in a horizontal storage position, so as to support different sizes of vehicles and so that the car may be used for hauling other freight when not hauling automobiles, together with novel and improved means for staying the frame or rack and fastening the automobiles firmly against movement.

Preferably the invention provides a loading frame or rack of the character referred to at each end of the car, which rack may be adjusted to the desired inclined shipping position or to an elevated storage position when its use is not desired, combined with means for anchoring a vehicle on the rack and means for anchoring another vehicle to the car floor under the inclined elevated rack.

The invention consists of the features of construction, combination and arrangement of parts, hereinafter fully described and claimed, reference being had to the accompanying drawings, in which:—

Fig. 1 is a vertical longitudinal section through a portion of an auto-box car showing the application of the invention for holding two automobiles in loaded position therein.

Fig. 2 is a top plan view of the car holding means shown in Fig. 1, the car appearing in dotted lines.

Fig. 3 is a side elevation of a portion of one of the floor rails, partly in section.

Fig. 4 is an enlarged cross-section through one of the floor rails, showing the floor hold down or anchoring device.

Fig. 5 is a section on line 5—5 of Fig. 4.

Fig. 6 is a perspective view of a side post or bearing bracket.

Fig. 7 is a similar view of a door post or keeper bracket.

Figs. 8 and 9 are enlarged detail sectional views.

Referring now more particularly to the drawings, 1 designates a box car which may be of any standard construction, and which includes a floor 2, end walls 3, one of which is shown, side walls 4, and a roof 5.

Secured to the side walls 4 adjacent to the end wall 3 are series of superposed bearing and supporting brackets 6 arranged in vertical alignment on the side walls at different elevations, each of said brackets being provided with a U-shaped open bearing recess or socket 7, and arranged on the side walls at the top of the car and somewhat closer to the end wall 3 is a pair of similar brackets 6a having U-shaped open bearing recesses 7a. On the side wall, between the brackets 6 and the transverse center of the car, is a series of superposed supporting and holding or keeper brackets 8 similar to the brackets 6 and 6a and provided with U-shaped open keeper recesses or sockets 9, said brackets 8 being arranged at much higher elevations than the corresponding brackets 6.

The brackets 6, 6a and 8 are provided to pivotally mount and support a vehicle supporting frame, rack or half deck 10 in the car. This frame, rack or half deck comprises a pair of spaced channel runways or tracks 11 to receive the wheels of a vehicle A to be supported in an elevated and inclined position in the car, said runways or tracks being rigidly connected by transverse tie member 12 at their forward ends. The runways preferably have flared entrance ends to facilitate the entrance of the vehicle wheels thereto.

Connected to the runways and tying them together at their rear end is a cross bar or member 13, to which the runways may be rigidly or adjustably fastened. The body portion of this bar may be of any suitable cross-sectional form, but the end portions thereof, which project beyond the sides of the runways, terminate in rounded portions or journals 14 adapted for engagement with the seats or sockets of the brackets 6 or 6a to pivotally support the outer end of the frame or rack at any one of a number of different elevations. A similar bar or cross member 15 is connected with the runways adjacent the front ends thereof, and this bar has end extensions 16 adapted for engagement with the recesses or sockets 9 of the brackets 8, to hold such end of the frame in any one of a number of different elevations. By the described arrangement of the brackets 6 and 8 it will be understood that the loading frame may be engaged with a working pair of the brackets 6 and a working pair of the keepers 8 to hold the vehicle A in an inclined position in the upper portion of the car, as shown in full lines in Fig. 1, or engaged with the upper brackets 6a and a pair of brackets 8 for holding the frame in a storage position under the car roof, so that the frame may be arranged when the use of the car for transporting vehicles is not desired, allowing the car to be used for hauling other freight. The bar 15 is adjustably held in position upon the frame by slotted guides or keepers 17 on the runways, which permit the bar to be shifted longitudinally of the frame so that it may be moved out of the way of the brackets 8 in swinging the frame upwardly or downwardly and into engagement with a desired pair or set of the brackets 8 to support the inner end of the frame in the desired shipping position. The frame may be provided with a drip pan 18 of suitable type to catch any oil or grease which may drop from the suspended vehicle A and prevent the same from falling down upon a vehicle disposed below the same. Each channel runway is provided intermediately of its length with an upwardly offset or arched portion 19, and the drip pan is similarly arched, for a purpose hereinafter described.

To secure the vehicle A firmly in position on the frame, rear and front wheel chains 20 and 21 are employed. These chains are generally similar in construction and may correspond generally to anti-skid chains of the conventional type commonly employed. The chains 20 are secured at their rear ends to anchor bolts or links 22 fastened to chock blocks or stops 23 at the outer ends of the runways, and at their forward ends said chains are connected by links 24 with anchor bolts 25 engageable with openings in the runways for holding the chains in applied position. The chains 21 are connected at both their front and rear ends by links 26 similar to the links 24 with bolts 27 engaging openings in the runways, whereby such chains are secured in position. Any other suitable means for securing a vehicle A upon the loading frame may, however, be employed in an out of the way position and such means may engage either the wheels or the axles of the vehicle, or both, as desired.

In order to hold the frame or rack when in inclined supporting position against possibility of displacement from the bearing and holding brackets, hold-down or stay connections between the runways and the car floor are employed. Each of these, as shown, consists of a rod comprising two sections 28 and 29 united by a turnbuckle 30, the rod section 28 being pivoted to its runway, as at 31, and the rod section 29 being connected by one or more chain links 31a with an anchor member 32.

The fastening member 32 is permanently fastened in a countersink in the floor to a supporting plate 32a at the car side sill 32b.

The floor of the car is provided with an elongated groove 33' on each side of which a plate 35 is countersunk into the floor, said plates being provided with a depending flange 34 extending into the slot 33' and provided in its bottom edge with a series of seats 33.

By supporting the vehicle A by means of the loading frame or rack in the inclined position shown, space is afforded to permit a second vehicle B to be carried at the same end of the car and nested in the space beneath the elevated inclined frame. The wheels of this vehicle B will rest directly upon the floor and the slot forming anchor plates 35 are employed as part of a means for holding this vehicle from shifting. As shown, each wheel tire of the vehicle B is engaged by a chain 36 connected at one end to a link 37 carried by a chock block 38 provided with a T-shaped anchor member 39 adapted to be inserted into the adjacent floor slot and interlocked with the holding seats 33 of the plates 35. The other end of the chain has its side members engaged with hooks 40 on fork arms of a tensioning lever 43 having a looped handle portion and pivotally mounted upon a fulcrum bracket 41 and adapted to be engaged by a pivoted latch 45 on the fulcrum bracket 41 whereby said lever may be held in tensioning position. The bracket 41 carries a T shaped anchor member 46 for engagement with the seats 33 of the plates 35. It will thus be understood that the chains 36 may be engaged with the tires of the wheels of the vehicle B and their anchor means placed in locking position and the chain then drawn taut by means of the tensioning levers and the latter locked to hold them taut and their anchoring devices in locking position, thus holding the vehicle from shifting on the floor. The provision of the recesses in the car floor and countersunk slot forming and holding plates 35 provides for the locking engagement of the anchor members 39 and 46 with the floor at different points in the floor according to the lengths of vehicles B to be shipped, and the countersunk arrangement of the plates leaves the floor free from obstructions interfering with the shipping of other kinds of freight. When the vehicle B is placed in position its forward portion will fit into the space or recess formed by the upwardly offset portions 19 of the runways and arched portion of the drip pan, thus providing for a more compact assemblage of the two automobiles, as well as for the accommodation of automobiles of the longest wheel base on the floor.

From the foregoing description, taken in connection with the drawings, the construction and mode of use of my improved vehicle holding means for box cars will be readily understood and the advantages thereof appreciated by those versed in the art without a further and extended description. While the structural features disclosed are preferred, it is, of course, to be understood that changes in the form, proportion, details of construction and arrangement of parts may be resorted to, within the scope of the appended claims, without departing from the spirit or sacrificing any of the advantages of the invention.

What I claim is:—

1. In means for loading vehicles in a freight car, a group of superposed coacting pairs of substantially U-shaped open bearing sockets on the sides of the car at a low level with respect to the car floor, a group of superposed coacting pairs of substantially U-shaped open keeper sockets on the sides of the car at a higher level with respect to the car floor, a car supporting frame having cross members for selective pivotal and supporting engagement with the bearing sockets and supporting engagement with the keeper sockets, means for anchoring a vehicle to the frame, and an adjustable tie connection between the elevated frame and the car for holding the cross members in engagement with the bearing and keeper sockets.

2. In means for loading vehicles in a freight car, a plurality of superposed coacting pairs of substantially U-shaped open bearings on the sides of the car at a low level with respect to the car floor, a plurality of superposed coacting pairs of substantially U-shaped open keepers on the sides of the car at a higher level with respect to the car floor, and a car supporting frame having cross members, one adjustable with relation to the other on the frame, for selective pivotal and supporting engagement with the bearing members and supporting engagement with the keeper members.

3. In means for loading vehicles in a freight car, a frame having runways for the wheels of the vehicle, transverse supporting members at each end of the frame, one of said members being slidable relatively to the frame, substantially U-shaped open bearings at the sides of the car engageable by the supporting member at one end of the frame to pivotally mount the frame to swing vertically, substantially U-shaped open keepers at the sides of the car engageable by the supporting member at the open end of the frame whereby the frame may be supported in an upwardly inclined position, means for anchoring a vehicle to the frame, and an adjustable tie connection between the elevated frame and the floor for holding the supporting members in engagement with the open bearings and keepers.

4. In means for loading vehicles in a freight car, a frame having runways for the wheels of the vehicle, a transverse supporting bar at each end of the frame having end extensions projecting beyond the sides of the frame, one of said bars being slidably adjustable relatively of the frame, substantially U-shaped open bearings at the sides of the car in which the extended ends of the supporting bar at such end of the frame are mounted for pivotally supporting the frame for vertical swinging movement, substantially U-shaped open keepers at the sides of the frame engageable by the extended ends of the supporting bar at such end of the frame, whereby the frame may be supported in an upwardly inclined position, means for anchoring a vehicle to the frame, and a tie connection between the elevated frame and the floor for holding the bars in engagement with the open bearings and keepers.

5. In means for loading vehicles in a freight car, a plurality of superposed coacting pairs of substantially U-shaped open bearings on the sides of the car at a low level with respect to the car floor, a plurality of superposed coacting pairs of substantially U-shaped open keepers on the sides of the car at a higher level with respect to the car floor, a car supporting frame having cross members, one adjustable with relation to the other on the frame, for selective pivotal and supporting engagement with the bearing members and supporting engagement with the keeper members, means for anchoring a vehicle to the frame, and a tie connection between the elevated frame and the car for holding the cross members in engagement with the bearings and keepers.

6. In vehicle loading means for box cars, a group of open trunnion bearings arranged on each side of the car in superposed relation, a group of open keepers arranged on each side of the car in superposed relation above the level of the highest open bearing of the group, a vehicle supporting frame having laterally projecting trunnions and engaging members for coaction with the trunnion bearings and keepers, whereby the frame may be disposed and supported in an inclined position within the car, and a stay connection between the frame and bottom of the car for drawing the frame down and holding said trunnions and engaging members from displacement from the trunnion bearings and keepers.

7. In means for loading vehicles in a freight car, a plurality of superposed coacting pairs of substantially U-shaped open bearings on the sides of the car at a low level with respect to the car floor, a plurality of superposed coacting pairs of substantially U-shaped open keepers on the sides of the car at a higher level with respect to the car floor, and a car supporting frame having cross members for selective detachable pivotal and supporting engagement with the bearing members and supporting engagement with the keeper members for supporting the frame in any one of a plurality of inclined positions in the car.

8. In means for loading vehicles in a freight car, a group of superposed coacting pairs of substantially U-shaped open bearing sockets on the sides of the car at a low level with respect to the car floor, a group of superposed coacting pairs of substantially U-shaped open keeper sockets on the sides of the car at a higher level with respect to the car floor, a car supporting frame and cross members on the frame having trunnions for selective detachable pivotal and supporting engagement respectively with the bearing and sockets whereby the frame may be supported in a plurality of upwardly inclined positions.

9. In means for loading vehicles in a freight car, a frame having runways for the wheels of the vehicle, a plurality of vertically spaced substantially U-shaped open bearings at the sides of the car, trunnions at one end of the frame pivotally engageable with said bearings at different elevations to mount the frame to swing vertically, a plurality of vertically spaced substantially U-shaped open keepers at the sides of the car, and trunnions at the opposite end of the frame engageable with said keepers whereby the frame may be supported in any one of a plurality of upwardly inclined positions, the second-named trunnions being slidably mounted for longitudinal shifting movement on the frame toward and from the first-named trunnions.

10. In vehicle loading means for box cars, longitudinally spaced pairs of holding elements on the sides of the car forming open receiving seats located at different elevations, a vehicle supporting frame having means at its ends to rest in said seats for supporting the frame to hold a vehicle at an inclined position, an inclined bracing connection between the frame and car floor connected to the frame between its supported ends and arranged at right angles to the plane of the frame to maintain the frame in engagement with the holding means, and adjusting and tightening means in the connection.

WILLIAM L. THOMAS.